US008938677B2

(12) United States Patent (10) Patent No.: US 8,938,677 B2
Geppert et al. (45) Date of Patent: Jan. 20, 2015

(54) SYSTEM AND METHOD FOR MODE-NEUTRAL COMMUNICATIONS WITH A WIDGET-BASED COMMUNICATIONS METAPHOR

(75) Inventors: Birgit Geppert, Basking Ridge, NJ (US); Frank Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 59 days.

(21) Appl. No.: 12/749,122

(22) Filed: Mar. 29, 2010

(65) Prior Publication Data

US 2010/0251124 A1 Sep. 30, 2010

Related U.S. Application Data

(60) Provisional application No. 61/164,753, filed on Mar. 30, 2009.

(51) Int. Cl.
*H04L 12/16* (2006.01)
*H04N 7/15* (2006.01)
(Continued)

(52) U.S. Cl.
CPC ............... *H04M 1/247* (2013.01); *G06Q 10/10* (2013.01); *H04L 51/04* (2013.01); *H04L 12/581* (2013.01);
(Continued)

(58) Field of Classification Search
CPC .. G06Q 10/10; H04L 12/1822; H04L 12/581; H04L 51/04
USPC ...................... 715/734, 733, 753; 379/202.01; 348/14.08
See application file for complete search history.

(56) References Cited

U.S. PATENT DOCUMENTS

| 5,533,110 A | 7/1996 | Pinard et al. |
| 5,627,978 A | 5/1997 | Altom et al. |

(Continued)

FOREIGN PATENT DOCUMENTS

| CN | 1292127 | 4/2001 |
| DE | 19543870 | 5/1996 |

(Continued)

OTHER PUBLICATIONS

Honda et al., e-MuICS: multi-party conference system with virtual space and the intuitive input interface, 2004, Applications and the Internet, Proceedings. 2004 International Symposium on. p. 56-63.*

(Continued)

*Primary Examiner* — Jordany Nunez

(57) ABSTRACT

Disclosed herein are systems, methods, and non-transitory computer-readable storage media for managing communications mode neutrally using widgets. The method includes presenting via a graphical user interface (GUI) a set of connected graphical elements representing a communication session comprising at least two communicating users, wherein each graphical element representing a user further comprises at least one graphical sub-element indicating user communication details, receiving user input associated with the set of connected graphical elements, the user input having an action associated with the communication session, and performing the action based on the received user input. The graphical sub-elements can indicate a communication mode through which an associated user connects to the communication session and/or available communication modes for an associated user. The graphical sub-elements can include a telephone, mobile phone, instant message, camera, video camera, microphone, text-message, document, headset, or email icon.

22 Claims, 9 Drawing Sheets

(51) Int. Cl.

| | | |
|---|---|---|
| *H04M 3/56* | (2006.01) | |
| *G06F 15/16* | (2006.01) | |
| *G06F 3/048* | (2013.01) | |
| *H04M 1/247* | (2006.01) | |
| *G06F 3/0481* | (2013.01) | |
| *G06F 3/0486* | (2013.01) | |
| *H04L 12/18* | (2006.01) | |
| *H04W 4/20* | (2009.01) | |
| *H04L 29/06* | (2006.01) | |
| *G06Q 10/10* | (2012.01) | |
| *H04L 12/58* | (2006.01) | |
| *H04M 1/2745* | (2006.01) | |
| *H04M 3/42* | (2006.01) | |

(52) U.S. Cl.
CPC .......... *G06F 3/04817* (2013.01); *G06F 3/0486* (2013.01); *H04L 12/1822* (2013.01); *H04M 1/274508* (2013.01); *H04M 1/27455* (2013.01); *H04M 3/42068* (2013.01); *H04M 3/42161* (2013.01); *H04M 3/42221* (2013.01); *H04M 3/42289* (2013.01); *H04M 3/563* (2013.01); *H04M 3/564* (2013.01); *H04M 2201/42* (2013.01); *H04M 2203/5027* (2013.01); *H04M 2250/22* (2013.01); *H04M 2250/62* (2013.01); *H04W 4/206* (2013.01); *H04L 65/1069* (2013.01); *H04L 65/403* (2013.01)
USPC ...... 715/734; 715/733; 715/753; 379/202.01; 348/14.08

(56) References Cited

U.S. PATENT DOCUMENTS

| | | | |
|---|---|---|---|
| 5,745,711 A | 4/1998 | Kitahara et al. | |
| 5,768,552 A | 6/1998 | Jacoby | |
| 5,892,764 A | 4/1999 | Riemann et al. | |
| 5,940,488 A | 8/1999 | DeGrazia et al. | |
| 5,999,609 A | 12/1999 | Nishimura | |
| 6,067,357 A | 5/2000 | Kishinsky et al. | |
| 6,191,807 B1 | 2/2001 | Hamada et al. | |
| 6,415,020 B1 | 7/2002 | Pinard et al. | |
| 6,445,682 B1 | 9/2002 | Weitz | |
| 6,496,201 B1* | 12/2002 | Baldwin et al. ............... | 715/753 |
| 6,501,740 B1 | 12/2002 | Sun et al. | |
| 6,559,863 B1* | 5/2003 | Megiddo ....................... | 715/753 |
| 6,751,669 B1 | 6/2004 | Ahuja et al. | |
| 6,853,398 B2 | 2/2005 | Malzbender et al. | |
| D528,553 S | 9/2006 | Nevill-Manning et al. | |
| D529,036 S | 9/2006 | Koch et al. | |
| D529,037 S | 9/2006 | Koch et al. | |
| D529,920 S | 10/2006 | Nevill-Manning et al. | |
| 7,124,164 B1 | 10/2006 | Chemtob | |
| 7,127,685 B2* | 10/2006 | Canfield et al. ............... | 715/842 |
| 7,162,699 B1 | 1/2007 | Pena-Mora et al. | |
| 7,167,182 B2 | 1/2007 | Butler | |
| 7,213,206 B2* | 5/2007 | Fogg ............................. | 715/706 |
| 7,269,162 B1 | 9/2007 | Turner | |
| 7,478,129 B1* | 1/2009 | Chemtob ....................... | 709/204 |
| D591,304 S | 4/2009 | Banks et al. | |
| 7,519,912 B2* | 4/2009 | Moody et al. ................. | 715/753 |
| D603,866 S | 11/2009 | Banks et al. | |
| 7,949,952 B2 | 5/2011 | Hawley et al. | |
| 8,082,302 B2 | 12/2011 | Becker et al. | |
| 8,144,633 B2* | 3/2012 | Yoakum et al. ............... | 370/261 |
| 8,223,186 B2 | 7/2012 | Derocher et al. | |
| 8,786,664 B2* | 7/2014 | Hornyak et al. ........... | 348/14.03 |
| 2003/0001890 A1 | 1/2003 | Brin | |
| 2003/0133562 A1 | 7/2003 | Ooki | |
| 2003/0206619 A1* | 11/2003 | Curbow et al. .......... | 379/210.01 |
| 2003/0236835 A1* | 12/2003 | Levi et al. ..................... | 709/204 |
| 2004/0019683 A1 | 1/2004 | Lee et al. | |
| 2004/0028199 A1 | 2/2004 | Carlson | |
| 2004/0125937 A1 | 7/2004 | Turcan et al. | |
| 2004/0218751 A1 | 11/2004 | Colson et al. | |
| 2004/0258222 A1* | 12/2004 | Kobrosly et al. .......... | 379/93.21 |
| 2004/0264652 A1 | 12/2004 | Erhart et al. | |
| 2005/0021624 A1* | 1/2005 | Herf et al. ..................... | 709/204 |
| 2005/0132012 A1* | 6/2005 | Muller et al. ................. | 709/206 |
| 2005/0141694 A1 | 6/2005 | Wengrovitz | |
| 2005/0151836 A1* | 7/2005 | Ni ............................... | 348/14.09 |
| 2005/0182745 A1 | 8/2005 | Dhillon et al. | |
| 2005/0251555 A1* | 11/2005 | Little, II ........................ | 709/206 |
| 2006/0023859 A1 | 2/2006 | Crockett et al. | |
| 2006/0059236 A1* | 3/2006 | Sheppard et al. ............. | 709/206 |
| 2006/0098793 A1 | 5/2006 | Erhart et al. | |
| 2006/0117264 A1 | 6/2006 | Beaton et al. | |
| 2006/0135142 A1 | 6/2006 | Repka | |
| 2006/0190546 A1* | 8/2006 | Daniell ......................... | 709/206 |
| 2006/0235716 A1* | 10/2006 | Mahesh et al. .................... | 705/1 |
| 2006/0236269 A1 | 10/2006 | Boma | |
| 2007/0053308 A1* | 3/2007 | DuMas et al. ................. | 370/254 |
| 2007/0121893 A1 | 5/2007 | Khouri et al. | |
| 2007/0201674 A1 | 8/2007 | Annadata et al. | |
| 2007/0206768 A1 | 9/2007 | Bourne et al. | |
| 2007/0208806 A1 | 9/2007 | Mordecai et al. | |
| 2007/0260685 A1* | 11/2007 | Surazski ........................ | 709/204 |
| 2007/0288627 A1* | 12/2007 | Abella et al. .................. | 709/224 |
| 2008/0005235 A1* | 1/2008 | Hegde et al. .................. | 709/204 |
| 2008/0075247 A1 | 3/2008 | Tanaka et al. | |
| 2008/0080386 A1 | 4/2008 | Calahan et al. | |
| 2008/0115087 A1 | 5/2008 | Rollin et al. | |
| 2008/0148156 A1 | 6/2008 | Brewer et al. | |
| 2008/0167056 A1 | 7/2008 | Gilzean et al. | |
| 2008/0263475 A1 | 10/2008 | Hwang | |
| 2008/0266378 A1 | 10/2008 | Ryu | |
| 2008/0309617 A1 | 12/2008 | Kong et al. | |
| 2009/0006980 A1 | 1/2009 | Hawley et al. | |
| 2009/0019367 A1 | 1/2009 | Cavagnari et al. | |
| 2009/0024952 A1 | 1/2009 | Brush et al. | |
| 2009/0054107 A1 | 2/2009 | Feland, III et al. | |
| 2009/0059818 A1 | 3/2009 | Pickett | |
| 2009/0089683 A1 | 4/2009 | Thapa | |
| 2009/0138554 A1 | 5/2009 | Longobardi et al. | |
| 2009/0204904 A1 | 8/2009 | Mujkic et al. | |
| 2009/0241031 A1 | 9/2009 | Gamaley et al. | |
| 2009/0248709 A1 | 10/2009 | Fuhrmann et al. | |
| 2009/0249226 A1 | 10/2009 | Manolescu et al. | |
| 2009/0319623 A1* | 12/2009 | Srinivasan et al. ............ | 709/206 |
| 2010/0011304 A1 | 1/2010 | van Os | |
| 2010/0023585 A1* | 1/2010 | Nersu et al. ................... | 709/206 |
| 2010/0076807 A1 | 3/2010 | Bells et al. | |
| 2010/0083137 A1* | 4/2010 | Shin et al. ..................... | 715/756 |
| 2010/0085417 A1* | 4/2010 | Satyanarayanan et al. ........................... | 348/14.08 |
| 2010/0162153 A1 | 6/2010 | Lau | |
| 2010/0167710 A1 | 7/2010 | Alhainen | |
| 2010/0223089 A1 | 9/2010 | Godfrey et al. | |
| 2010/0234052 A1* | 9/2010 | Lapstun et al. ............... | 455/466 |
| 2010/0312836 A1* | 12/2010 | Serr et al. ...................... | 709/206 |
| 2011/0022968 A1 | 1/2011 | Conner et al. | |
| 2011/0109940 A1* | 5/2011 | Silverbrook et al. ......... | 358/1.15 |
| 2011/0151905 A1* | 6/2011 | Lapstun et al. ............... | 455/466 |
| 2011/0191136 A1 | 8/2011 | Bourne et al. | |
| 2011/0296312 A1* | 12/2011 | Boyer et al. .................. | 715/736 |
| 2012/0019610 A1* | 1/2012 | Hornyak et al. ........... | 348/14.02 |
| 2012/0083252 A1* | 4/2012 | Lapstun et al. ............. | 455/414.1 |
| 2012/0084672 A1 | 4/2012 | Vonog et al. | |
| 2012/0110473 A1* | 5/2012 | Tseng ............................ | 715/753 |
| 2012/0216129 A1* | 8/2012 | Ng et al. ....................... | 715/753 |
| 2012/0259633 A1* | 10/2012 | Aihara et al. ................. | 704/235 |
| 2013/0080954 A1* | 3/2013 | Carlhian et al. .............. | 715/769 |
| 2013/0108035 A1* | 5/2013 | Lyman ..................... | 379/218.02 |
| 2013/0250038 A1* | 9/2013 | Satyanarayanan et al. ........................... | 348/14.11 |
| 2013/0268866 A1* | 10/2013 | Lyman .......................... | 715/751 |

FOREIGN PATENT DOCUMENTS

| | | |
|---|---|---|
| DE | 19716316 | 10/1998 |
| EP | 0453128 | 10/1991 |
| EP | 0717544 | 6/1996 |
| EP | 1480422 | 11/2004 |

(56) References Cited

FOREIGN PATENT DOCUMENTS

| | | |
|---|---|---|
| EP | 1983729 | 10/2008 |
| EP | 1983729 A1 | 10/2008 |
| GB | 2338146 | 12/1999 |
| JP | H08-251261 | 9/1996 |
| JP | 2004-199644 | 2/1997 |
| JP | 2002-297873 | 10/2002 |
| JP | 2003-296556 | 10/2003 |
| JP | 2004-102389 | 4/2004 |
| JP | H09-055983 | 7/2004 |
| JP | 2004-320235 | 11/2004 |
| JP | 2005-318055 | 11/2005 |
| JP | 2006-050370 | 2/2006 |
| JP | 2006-060340 | 3/2006 |
| JP | 2006-092367 | 4/2006 |
| JP | 2007-004000 | 1/2007 |
| JP | 2008-171068 | 7/2008 |
| JP | 2009-502048 | 1/2009 |
| JP | 2009-044679 | 2/2009 |
| KR | 2006-1158872 | 6/2006 |
| KR | 2006-0132484 | 12/2006 |
| KR | 2009-0001500 | 1/2009 |
| WO | WO 9821871 | 5/1998 |
| WO | WO 9945716 | 9/1999 |
| WO | WO 0018082 | 3/2000 |
| WO | WO 2006054153 | 5/2006 |
| WO | WO 2006/060340 | 6/2006 |
| WO | WO 2007/008321 | 1/2007 |

OTHER PUBLICATIONS

Byrne et al., "Developing multiparty conferencing services for the NGN: towards a service creation framework", Jun. 2004, ISICT '04: Proceedings of the 2004 International Symposium on Information and Communication.

WebEx, WebEx Meeting Center User's Guide, 2007. WebEx Communications Inc., Version 8, pp. 1-332.

\* cited by examiner

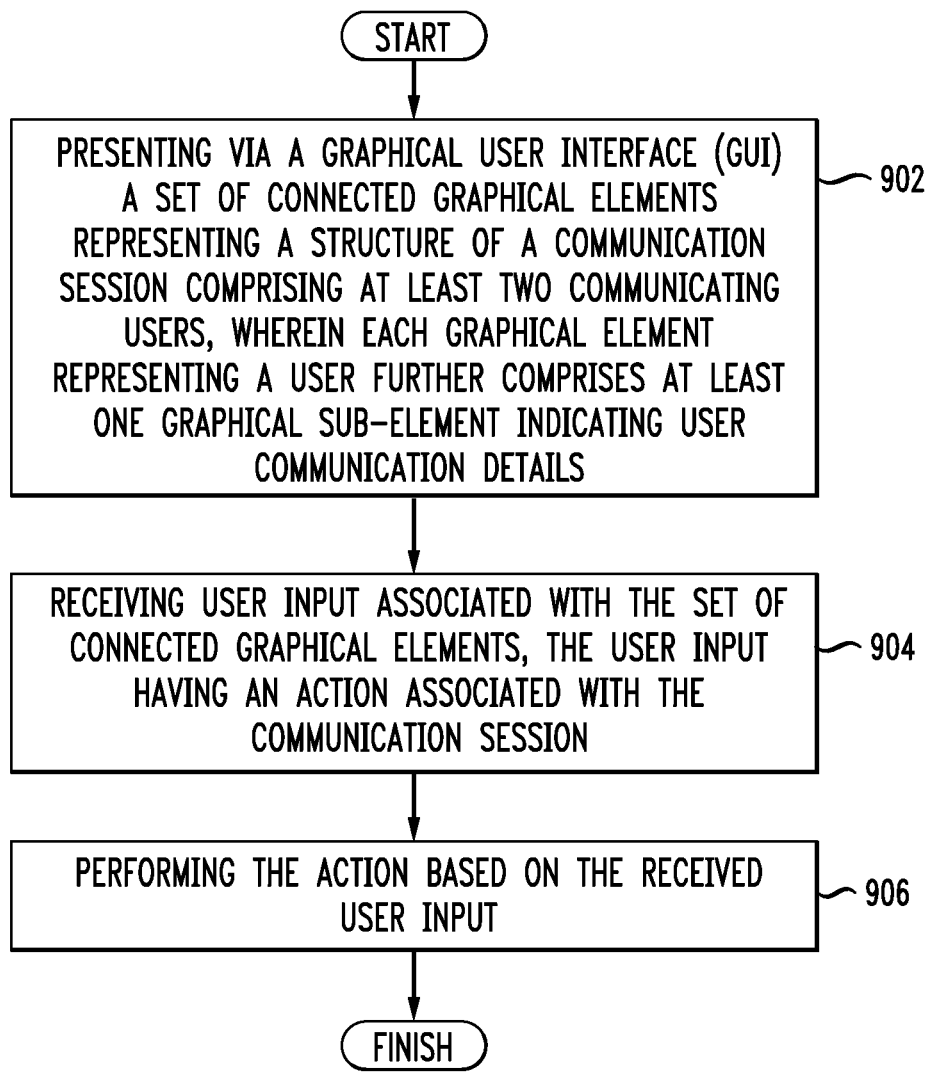

SYSTEM AND METHOD FOR MODE-NEUTRAL COMMUNICATIONS WITH A WIDGET-BASED COMMUNICATIONS METAPHOR

RELATED APPLICATIONS

This application is related to application Ser. Nos. 12/749,028, 12/749,058, 12/749,094, 12/749,123, 12/749,150, 12/749,178, and 12/749,103, filed on Mar. 29, 2010, each of which is herein incorporated by reference.

BACKGROUND

1. Technical Field

The present disclosure relates to telecommunications and more specifically to displaying and managing communication sessions via a graphical user interface (GUI). Communication sessions can exist in a variety of modes such as telephone calls, communication sessions, instant messaging sessions, email sessions, video conference sessions, multimedia sessions, and the like.

2. Introduction

Touchtone telephones have been supplemented over the years by the addition of feature buttons and menus. Interfaces for these features have evolved from simple buttons to hierarchical menus actuated by trackballs, quadrant style pointers, and the like. As the number of features increases, the interfaces add more buttons, sequences, and/or combination of button presses. This proliferation of features has led to a multitude of different interfaces with varying levels of complexity. Often users resort to rote memorization of key features, but that is not always practical or desirable. Recently, smartphones with touch-sensitive displays have begun to provide similar functionality. However, the touch-sensitive displays in such devices typically reproduce the feature buttons and menus, albeit on a touch-sensitive display.

Further, users are migrating to other communication forms, such as text messaging, instant messaging, email, chat sessions, video conferencing, and so forth. Incorporating the ability to handle these modes of communication into a traditional telephone increases the complexity and difficulty manyfold. What is needed in the art is a more intuitive communication management interface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communication session management. A companion case U.S. patent application Ser. No. 12/749,028, filed on Mar. 29, 2010 discloses a graphical interface which enables a user to setup a communication session with various users and tear down or remove users from a communication session. A system, method and non-transitory computer-readable media are disclosed which in each respective embodiment relate to graphical user interfaces for managing various types of communication sessions quickly and efficiently based on a graphical user interface having communication related widgets. In the system embodiment, the system displays to the user on a graphical user interface a set of graphical connected elements representing a structure of a particular communication session or group of communication sessions. This disclosure focuses on mode-neutral communications graphic interface in which icons or images of participants in a communication session can be connected by a user graphically adding a communications widget to the respective icons. The communication widgets can relate to various modes of communication such as by: telephone, conference call, video conference, web conference, IM session, email, and so forth. The communication mode can also be deleted, changed or otherwise modified by managing the use of the widgets in the interface. A brief introductory description with reference to FIG. 2 will be provided, followed by a discussion of a basic general purpose system or computing device in FIG. 1 which can be employed to practice the concepts disclosed herein. A more detailed description of methods and graphical interfaces will then follow.

Figure 2:
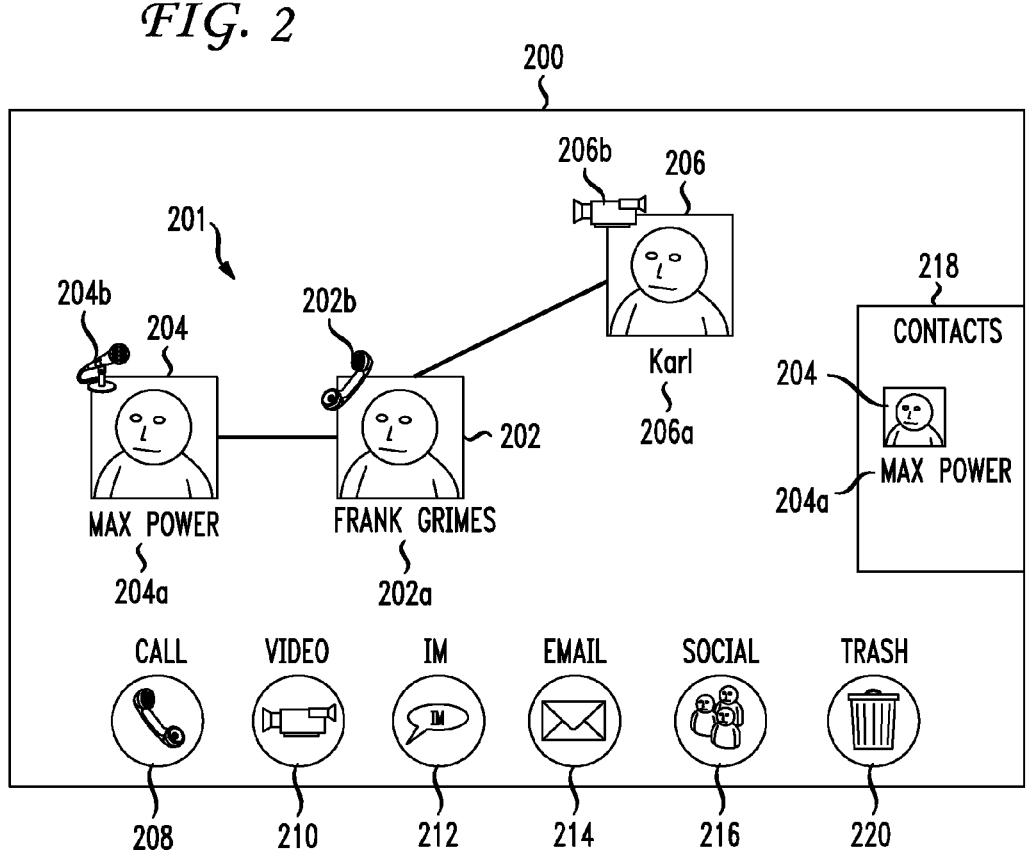
FIG. 2 illustrates a graphical view of a communication session.

The graphical interface 200 of FIG. 2 illustrates the communication session with three users communicating in a conference call. The interface 200 receives user input, which can include multimodal user input, to manage the communication session. For example, a user on a conference call can perform a drag and drop input or otherwise move and locate to select a contact from a contacts list 218 and add the new contact to the communication session. The system receives such input and automatically dials the phone number for that contact and adds them to the conference call. Users can be dropped from the call by dragging a connected element representing the user to a trash bin 220 or other icon or location on the display representing deleting them from the communication session.

The communication session is also agnostic with respect to the mode of communication. The same metaphor of a connected user in a communication session being displayed on the graphical interface can represent a called/calling user, an instant messaging (IM) user, an email user, a user connecting via video conferencing, and so forth. The presentation of the graphical elements, how they are connected and how the user interacts with the elements all vary depending on the needs and current active context of the communication session. For example, the elements can include text, titles, positions, data about each user, etc. and the connection metaphor between users can also represent information such as the type of connection (phone, video, web conference, etc), the quality of the connection (low-band, high-band, etc.), a hierarchy of how participants are related to the primary user (friend, associate, acquaintance, un-trusted user, etc.), a status of the connection (active, inactive, on-hold, etc.), and so forth. For example, a user can select a contact and then use the same type of user input (drag and drop, flicking, gestures, etc.) to initiate any of the communication modes with a contact. The user does not have to know or learn different input mechanisms for different communication modes. These variations shall be discussed herein as the various embodiments are set forth. The disclosure now turns to FIG. 1.

Figure 1:
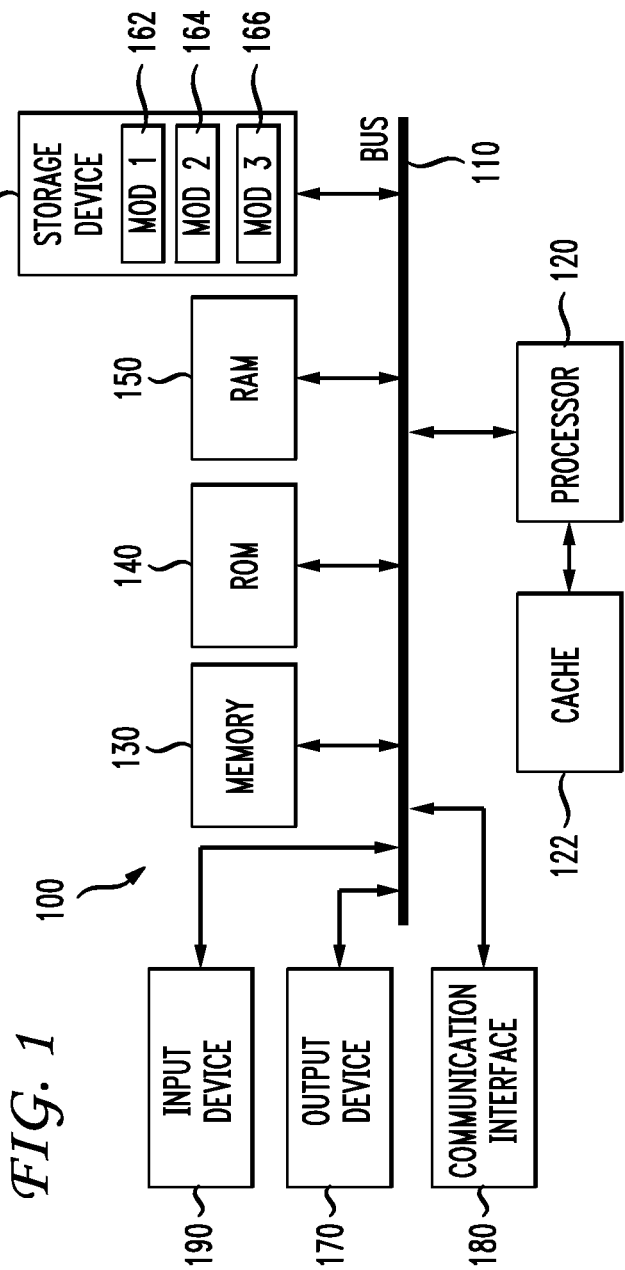
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. If the device includes a graphical display which also receives touch sensitive input, the input device 190 and the output device 170 can be essentially the same element or display. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having briefly discussed the exemplary system embodiment, the disclosure now turns to FIG. 2 and other graphical views of an interface for managing communication sessions. A system 100, such as the one described in FIG. 1, can be configured to display a graphical user interface 200, such as the one described in FIG. 2, and receive input for manipulating and managing the communication session. In one aspect, the system 100 interacts with a communications device, such as a telephone, instant messenger, personal or mobile computer, or email device to manage the communication session. For example, a user may have a desktop telephone that is in communication with a computing device which can interface with the telephone and present a display such as that shown in FIG. 2 to manage communication sessions using the telephone. As shall be discussed, the user can identify a person to contact, and then initiate any type of communication using the same mode to initiate any other type of communication. The system is agnostic in this respect. A drag and drop, gesture, tapping or any input mode described herein can be used to initiate and establish a phone call, teleconference with a group of individuals, an IM or email session, and so forth. All communication modalities are treated the same with respect to session control. For example, starting, ending, splitting or merging communication sessions, or adding/removing participants, all can be managed in using similar or identical modalities. Various examples of different inputs will be described in connection with the utility icons 208, 210, 212, 214, 216, 220 but any input mode can be applied to engage any utility.

A benefit of this approach is that the system can add additional communication modes to the modes already existing as is represented by the utility icons in FIG. 2, and the various semantics with respect to how the new communication is managed will be applied via the same communication modalities of the existing utilizes. For example, assume a drag and drop operation or a gesture operation on any of the utility icons connects it to a particular contact can begin a communication session between the user and the contact. The system can incorporate a new communication mechanism such as the Google Wave service (and thus a new utility icon) and implement that service using the same management modality (drag and drop or gesture on a Google Wave icon) as the other services.

FIG. 2 illustrates a first graphical view of a communication session. A system 100, such as the one described in FIG. 1, can be configured to display a graphical user interface and receive input for manipulating the communication session. In one aspect, the system 100 interacts with a communications device, such as a telephone, instant messenger, personal or mobile computer, or email device. In another aspect, the system 100 integrates the functions of one or more communications device. The system 100 receives input via a physical or on-screen keyboard, mouse, stylus, touch screen, speech command, touchless gestures, and/or single-touch or multi-touch gestures. The system 100 can also receive multi-modal input. Before establishing a communication session, the system 100 can show a blank home screen where the graphical elements representing communications utilities 208, 210, 212, 214, 216, 218, 220 are shown. The blank screen can include a wallpaper image or other pattern. In one variation, the system 100 displays a summary or welcome page showing a short summary of news, messages, contacts, upcoming calendar events, and/or configuration options. In yet another variation, the system 100 displays a default input mechanism, such as a ten-key numeric pad for dialing telephone numbers.

The display 200 shows a communication session of three connected graphical elements 202, 204, 206. The displayed communication session 201 represents a real-time communication. In this case, the real-time communication is a three-way conference call between Frank Grimes 202, Max Power 204, and Karl 206, shown by connecting lines between their respective icons 202, 204, 206. FIG. 2 is a graphical display of the conference call from Frank Grimes' point of view. Later figures will show the same conference call from the points of view of the other participants.

However, visualization of communication sessions and user controls are neutral with respect to various communication modalities and treat each the same even as users seek to join a call or other communication session. The only difference is the indicator used for the specific modality such as the communication modality icons 208, 210, 212, 214, 216. For instance, in FIG. 2 if Karl where connected through IM instead of video this would result just in a change of the mode icon from video 206b to IM.

The user can then add additional parties to the communication session in a similar manner. The user can remove participants from a communication session by dragging them to a trash can icon 220, providing a flicking motion, clicking an X associated with that participant, highlighting a participant and shaking a device, if it is mobile with accelerometer capability, or clicking a physical or graphical disconnect button. In one aspect where the communication session is via telephone, the system 100 removes participants from the communication session when the user hangs up the telephone receiver. As participants leave the communication session, the system 100 removes their icon from the graphical representation of the communication session.

The graphical elements shown are icons, but can also include images, text, video, animations, sound, caricatures, and/or avatars. Users can personalize their own graphical elements or feed a live stream of images from a camera or video camera, for example. In addition, the graphical elements can have an associated string of text 202a, 204a, 206a. The string of text can include a name, a title, a position, a telephone number, email address, a current status, presence information, location, and/or any other available information. The string of text can be separate from but associated with the graphical element, as shown in FIG. 2. Alternatively, the system 100 can overlay the string of text on top of the graphical element or integrate the text as part of the graphical element. All or part of the text and/or the graphical elements can be hyperlinks to additional information related to the user associated with the text or graphical elements, such as a blog or micro blog, email address, presence information, and so forth. The identifier 202a, 204a, 206a can also include a graphic or icon showing available modes of communication for that contact (IM only), presence information (in their office but on a call) or scheduling information (such as the person is/is not available but has an opening in 1 hour). Information in a graphical form can also include local time, a time in the time zone of the host of the communication session, and/or biological time. This information can help the user know whether to seek a communication with that contact. Such information can also be presented in connection with any icon or graphic representing an entity in a communication session.

The system 100 can include for each icon a graphical sub-element 202*b*, 204*b*, 206*b* that indicates the communication mode for each participant. For example, Max Power 204 is participating via an instant messaging (IM) client 204*b*; Frank Grimes 202 is participating via telephone 202*b*; Karl is participating via a video conference client 206*b*. The system 100 is mode-neutral, meaning that the system 100 treats each mode of communication the same, such as telephone, cellular phone, voice over IP (VoIP), instant messaging, e-mail, text messaging, screen sharing, file sharing, application sharing, and video conferencing. As a user changes from one mode to another, the sub-elements can change accordingly. For example, if Frank Grimes 202 changes from a landline to a cellular phone mid-conference, the telephone icon 202*b* can change to a mobile phone icon.

The graphical elements can also convey information about the conference call by changing type, size, color, border, brightness, position, and so forth. The lines, for example, can convey relationships between participants. A user can manually trigger the changes for their own icon or others' icons, or the system 100 can detect change events and change the graphical elements accordingly. Change events can be based on a contacted party, context, persona, connectivity status, and/or presence. For example, as one person is talking or typing a text message, the system 100 can enlarge their icon. As another example, the system 100 can track how much each person in the conference call is talking and move graphical elements up and down based on a total talk time in the conference call.

In another variation, the system 100 modifies the links connecting the graphical elements 202, 204, 206 by changing their thickness, length, color, style, and/or animating the links. These modifications can represent a currently active party, shared resources, an active communication session, a held communication session, a muted communication session, a pending communication session, a connecting communication session, a multi-party line, a sidebar conversation, a monitored transfer, an unmonitored transfer, selective forwarding, and selective breakup of the communication session into multiple communication sessions, and so forth.

In one aspect, a user provides input such as a gesture (such as a drag and drop, tap, and drag with a touch screen or performs any other instructive user input) to manipulate and manage the conference call. For example, the user can click a call icon 208, a video conference icon 210, an IM icon 212, an email icon 214, or a social media icon 216 to invite another user to join the communication session. A user can drag these icons and drop them on a contact or on a participant in a current communication session. For example, if an incoming communication session is in one modality (IM for example), the user can drag the call icon onto the incoming communication session to accept the incoming communication session but renegotiate it from IM to a call. A user can also initiate a communication session by dragging and dropping an appropriate icon onto a contact. Social media include web sites such as Facebook, Twitter, LinkedIn, MySpace, and so forth. Alternatively, the user can browse through a list of contacts 218, then drag and drop a desired contact to add the desired contact to the conference call. The system 100 then automatically contacts that person in their desired mode, a sender preferred mode, a currently available mode based on presence information, or in a common available mode between the participants and joins that person to the conference call. The system 100 can display other information as well, such as a calendar, notes, memos, personal presence information, and time. The system 100 display can be user-configurable. Each participant in the communication session 201 or contact in a list of contacts can have multiple associated addresses, phone numbers, or points of contact, such as a work phone, home phone, mobile phone, work email, home email, AIM address, Facebook chat address, and the like and that each may have an icon or a qualifier such as a symbol that indicates not only the party but the contact mode.

An incoming communication session icon can blink, bounce, pulse, grow, shrink, vibrate, change color, send an audible alert (such as a ringtone), and/or provide some other notification to the user of the incoming session. The user can interact with and manipulate this incoming request in the same manner as the other current communication sessions. The system 100 does not differentiate between an active communication session and a communication session representing an incoming request. For example, the user can drag and drop an incoming call on top of a communication session to add the incoming call directly to the communication session. As another example, the user can drag and drop an incoming session to a trash can icon to ignore, double click on the incoming session to send the incoming caller (if it is a call) to voicemail, or tap and hold to place the caller on hold.

In one aspect, user preferences guide the amount and type of information conveyed by the graphical elements and the associated text. User preferences can be drawn from a viewer's preferences and/or a source person's preferences. For example, a viewer sets preferences to show others' email addresses when available, but a source person sets preferences as never share email address. The source person's preferences (or preferences of the "owner" of the information) can override a third party's preferences.

One possible user input is to divide the communication session shown in FIG. 2. The user can draw a line with a mouse drag or a finger on a touch screen separating the communication session into two groups. The system 100 can then divide the communication session into two separate concurrent communication sessions based on the groups. In one aspect, a communication session manager can divide a communication session for a limited time, after which the communication sessions are automatically merged together. For example, a manager can say "Team A, discuss pros and cons of strategy A. Team B, discuss pros and cons of strategy B. After five minutes, we'll return and report on our discussions." Then the manager draws a line or otherwise selects groups for the breakout sessions and sets a duration. A dialog or icons can appear when the communication session is separated which present the available options for managing the separation. The system 100 divides the communication session and rejoins them after the set duration. The manager can indicate additional settings, such as prohibiting sidebar conversations between the groups during the breakout sessions. The manager can be independent of the breakout sessions and monitor each breakout session via audio, summary, and/or real-time text.

FIG. 2 also illustrates an interface 200 that can receive and present a new mode of communication while enabling users to manage a new mode with the same communication modalities of the other modes. Assume that in addition to the utility icons shown for calls 208, video 210, IM 212, email 214, and social networks 216, the system is to integrate a new communication mode. One benefit of a mode-neutral communication modality is that the system can implement a new communication mode but enable the user to control and management the new mode within communication sessions by applying the same input modalities as with the other communication modes. The GUI controls with respect to how to start or end a session will be the same. The system 100 can automatically integrate the functionality of the new mode to enable session control functions such as starting, ending, splitting, and so forth of sessions to be managed using the modalities familiar to the user.

Then the system presents a utility icon (not shown in FIG. 2) representing the new mode to the user. At this point, however, the user does not need to learn any new management modalities but can maintain the same semantics with respect to session control. The same call connection metaphors, control buttons, gestures, speech commands, flicker movements, device shaking or any other type of operation for user input will remain mode neutral. All of these input modalities are reused and applied in the interface for the additional modes of communication or communication device.

Figure 3:
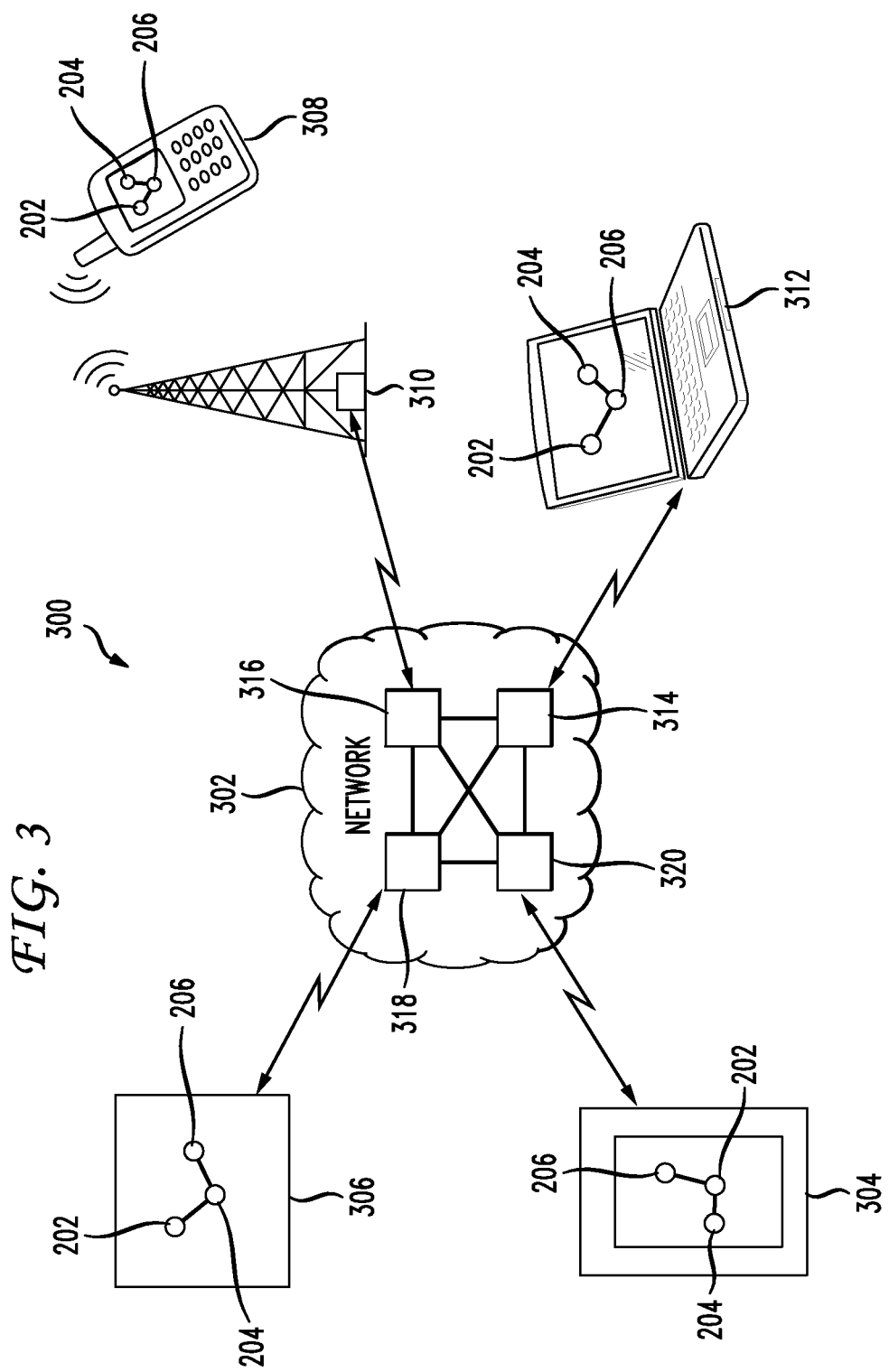
FIG. 3 illustrates a network view of the communication session.

Having discussed several variations of FIG. 2, the discussion now turns to a network view 300 of the communication session as shown in FIG. 3. A telecommunications network 302 connects various communications devices 304, 306, 308, 310, 312 and conveys information from device to device. The telecommunications network can be one of or a combination of a plain old telephone service (POTS) network, an asynchronous transfer mode (ATM) network, an integrated services digital network (ISDN), frame relay network, Ethernet network, token ring network, and any other suitable wired or wireless network. The network can include one or more interconnected nodes 314, 316, 318, 320 which perform all or part of the connection and transmission functionality that underlies the graphical representation of communication sessions on a GUI. Such network nodes 314, 316, 318, 320 can perform all the functionality in the network 302 or can operate in conjunction with end-user communication devices 304, 306, 308, 312 to manipulate communication sessions.

In one aspect, a centralized entity controls the communication session. The centralized entity can reside in the network or communicate via the network. The centralized entity can operate as a centralized enterprise intelligence server. In another aspect, the communication session control and functionality is distributed among multiple server resources 314, 316, 318, 320 in the network or cloud. In addition to a centralized intelligence and distributed intelligence in the cloud, the network 302 can provide this functionality using a peer-to-peer approach with intelligence on the endpoints. Some variations include providing standardized functionality on a standards-compliant server and non-standardized functionality distributed across the endpoints.

The display of each communications device shows a different aspect or view of the same communication session. For example, the display of device 304 shows the same display of the same participants 202, 204, 206 as shown in FIG. 2. The display of device 306 shows the same participants 202, 204, 206 in a different view of the communication session from the perspective of device 306. Likewise devices 308 and 312 show the same participants 202, 204, 206 in different views. In one aspect, a mobile device 308 connects with a wireless transmitter 310 to connect to the network. A mobile device 308 can generate its own view of the communication session or it can generate a duplicate or a companion view of another device's display.

FIG. 3 also can illustrate a view of a person or entity who seeks to contact someone in a communication session. For example, assume Mary has device 304 and wants to call Frank 202. If she does, if permissions are granted, she can be presented with a visual of Frank's communication session showing 202, 204, 206. This can provide her varying levels of detail with respect to the type of communication, who is on the call, the subject matter of the call, etc. In this manner, Mary can be presented with options since she now has this knowledge. Perhaps she may want to IM or email instead of call. She may request to join the conference call. She me want to send a message to Frank 202 that she noticed he was on a call and could he return her call in 1 hour. Presenting Mary with a graphical image of the communication session presence of the person she is calling enables a more efficient mechanism for her to determine how to best take the next step in communicating with Frank 202.

Figure 4:
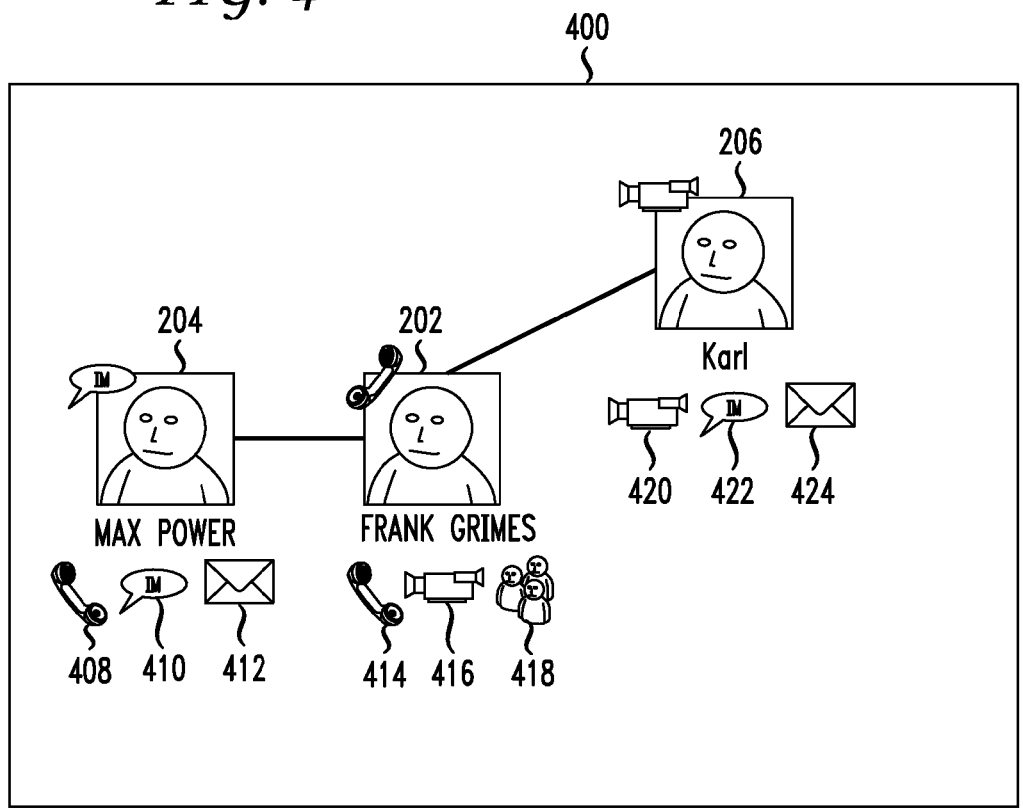
FIG. 4 illustrates graphical sub-elements for users in a communication session.

FIG. 4 illustrates graphical sub-elements for users in a communication session depicted on a display 400. The communication session includes Max Power 204, Frank Grimes 202, and Karl 206. One type of graphical sub-element represents a current communication modality. Users can change their own mode of communication by tapping on a different connection modality icon, for example. This allows a user to manually and seamlessly switch over from one modality to another mid-session. For example, a user participating in a communication session via cell phone who is now near a webcam can drag a video conferencing icon onto the communication session to switch from cell phone to video conferencing.

For example, Max Power 204 is currently communicating via instant messaging. Frank Grimes 202 is currently communicating via telephone. Karl 206 is currently communicating via video conferencing. While FIG. 4 shows these graphical sub-elements as small icons laid over the upper left corner of personal avatars, the system 100 can display such sub-elements in many different ways. For example, the system 100 can group avatars of users communicating via instant messaging around a single instant messaging icon. The system 100 can modify the link thickness, color, length, texture, animation, decoration, and so forth in place of or in combination other sub-elements.

In addition to the current communication modality icons, each participant's icon in the communication session can have associated sub-icons or sub-elements indicating available and/or preferred communication modalities. For example, Max Power 204 includes sub-icons for telephone 408, IM 410, and email 412. Frank Grimes 414 includes sub-icons for telephone 414, video conferencing 416, and social media 418. Karl 206 includes sub-icons for video conferencing 420, IM 422, and email 424. A user can interact with other communication session participants via these sub-icons or sub-elements. For example, in order to set up a sidebar communication session with Karl 206, Max Power 204 can click on the IM sub-icon 422 associated with Karl 206. A user can modify his or her own set of sub-icons in the communication session. For example, Frank Grimes 202 can drag the social media sub-icon 418 out to remove it from the group of sub-icons. Alternatively, Frank Grimes 202 can click on the video conferencing sub-icon 416 to change from a telephone connection to a video conferencing connection while remaining connected to the communication session.

Figure 5:
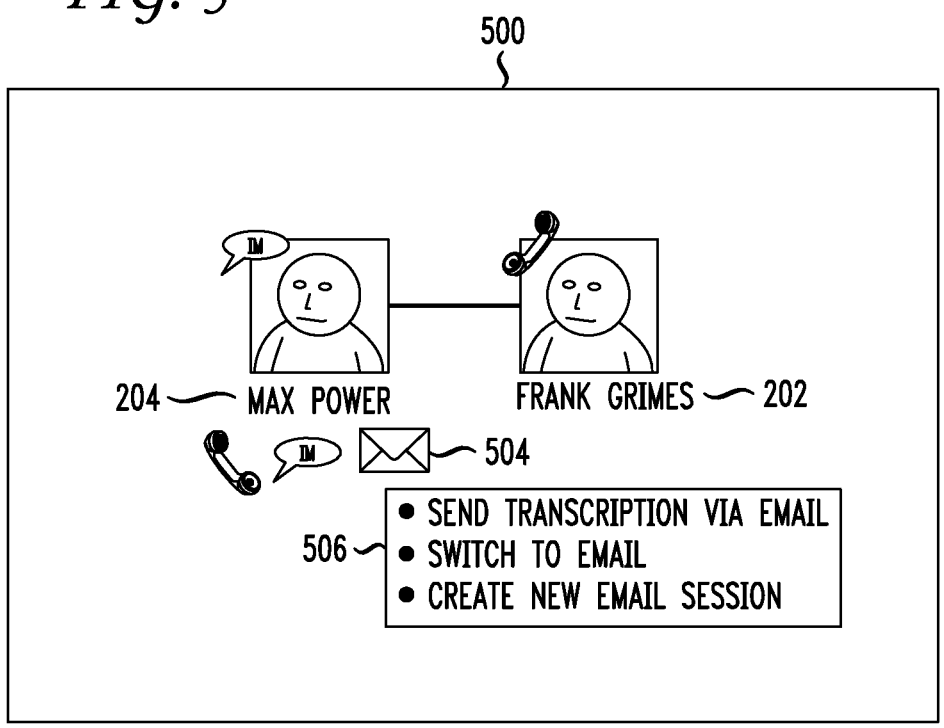
FIG. 5 illustrates additional context-sensitive menus for the graphical sub-elements.

In some cases, a sub-icon can represent multiple related facets of functionality. FIG. 5 illustrates a display 500 of additional context-sensitive menus for the graphical sub-elements. A user can access these context-sensitive menus by tapping and holding on the sub-icon, double clicking, swiping over the sub-icon, right clicking on the sub-icon, hovering a cursor over the sub-icon, and so forth. The system 100 can generate context-sensitive menus based on the type of input, the current status of the communication session, which user clicked on the sub-icon, and/or other relevant information. For example, if Max Power 204 clicks on the email sub-icon 504, the system 100 can display a context-sensitive menu 506 to send a transcription of the communication session via email, switch from IM to email, create a new email-based communication session, or other options. However, if Frank Grimes clicks on the same email sub-icon 504 associated with Max Power, the system 100 can generate a different set of options in a context-sensitive menu. The system 100 can transcode audio from a telephone call to text for a text messaging session via automatic speech recognition (ASR) and can convert in the other way via text-to-speech (TTS). Thus, Max 204 can communicate via IM with Frank 202 and Karl 206 in the same session but in different modes. These differences can be visually representing in the session display.

The display 500 can include additional sub-icons not related to any participant for all available modalities regardless of each participant's preferences. A user can drag a sub-icon from the additional sub-icons to a user to request interaction via a communication modality not currently preferred or available. For example, Max Power's 204 icon does not have an associated sub-icon for video conferencing. Frank Grimes can drag a video conferencing sub-icon from the additional sub-icons onto Max Power 204 to request a video conference.

Figure 6:
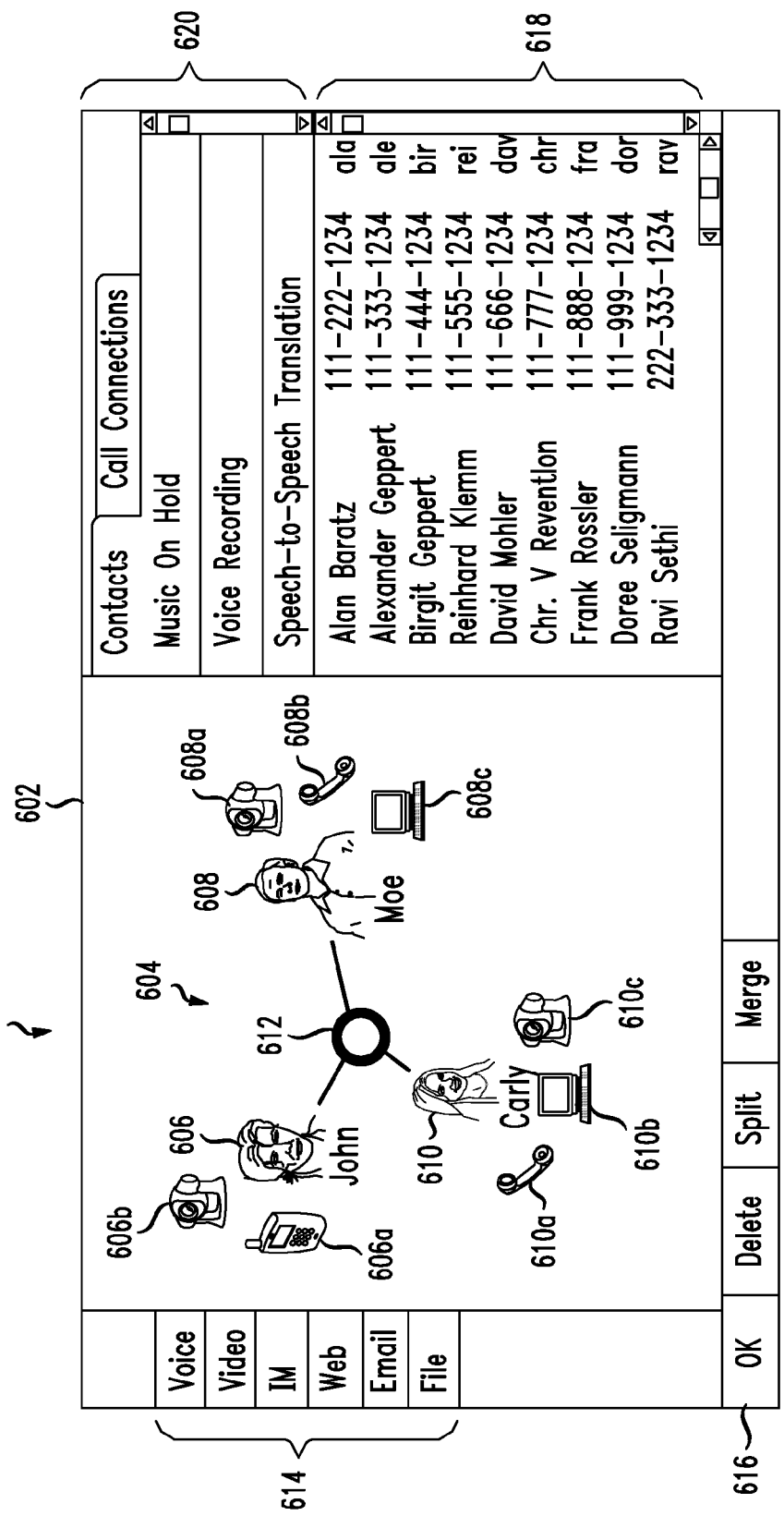
FIG. 6 illustrates a first alternate graphical view of a communication session.

FIG. 6 illustrates a first alternate user interface 600 having a graphical view of a communication session. The user interface 600 includes a communication session view 602 and various controls for manipulating one or more communication sessions 604, such as communication modality buttons 614, communication connection control buttons 616, a directory of contacts 618, and common action buttons 620. The "music on hold", "voice recording", and "speech to speech translation" are some example common action buttons 620. This configuration is exemplary. Other configurations can include more or less elements arranged in different ways.

The communication session view 602 depicts a communication session 604 with three participants, John 606, Moe 608, and Carly 610. In this example, the communication session view 602 includes a central hub or session manager 612 that links the participants. Each participant's icon can have a set of associated icons representing available or currently used communication modalities. For example, John 606 has a cellular phone icon 606*a* and a webcam icon 606*b*. Moe 608 has a webcam icon 608*a*, a telephone icon 608*b*, and a computer icon 608*c*. Carly 610 has a telephone icon 610*a*, a computer icon 610*b*, and a webcam icon 610*c*. A user can drag and drop graphical elements from the various portions of the user interface 600 to perform actions such as adding participants to the communication session 604, creating a new communication session, terminating a communication session, dividing a communication session, sharing information, and so forth.

Figure 7:
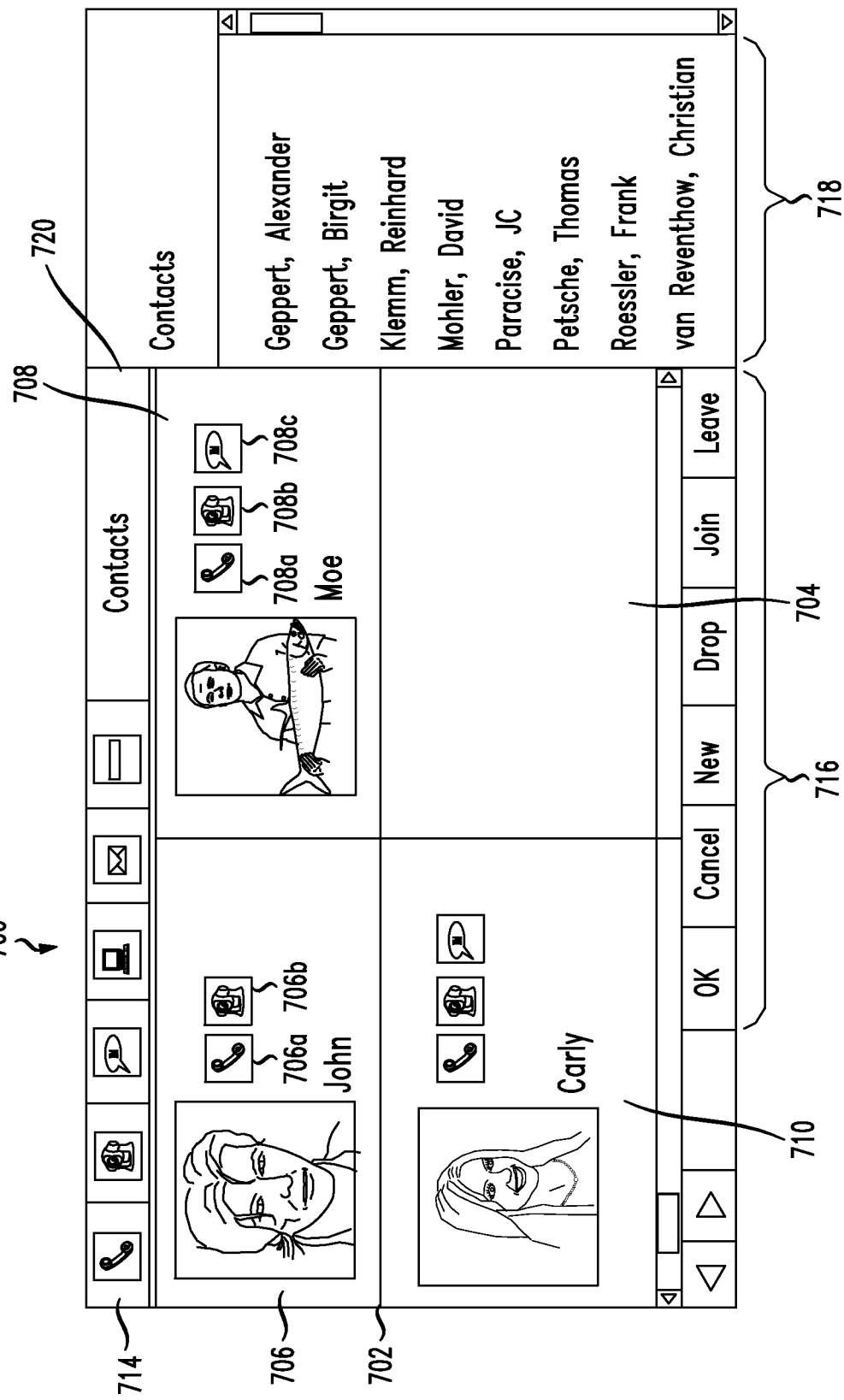
FIG. 7 illustrates a second alternate graphical view of a communication session.

FIG. 7 illustrates a second alternate graphical view of a communication session. The user interface 700 is presented in a very different arrangement from FIG. 6 but shows essentially the same information. The user interface 700 includes a communication session view 702 and various controls for manipulating one or more communication sessions 704, such as communication modality buttons 714, basic input/output buttons 716, a directory of contacts 718, and common action buttons 720. This configuration is also exemplary. The communication session view 702 depicts a communication session 704 with three participants, John 706, Moe 708, and Carly 710. In this configuration the communication session is not shown as linked icons, but rather as a set of rectangles occupying a shared region. In this example, the communication session view 702 does not include a graphical depiction of a central hub or session manager. Each participant's rectangle can include a set of associated icons representing available or currently used communication modalities. For example, John 706 has a cellular phone icon 706*a* and a webcam icon 706*b*. Moe 708 has a webcam icon 708*a*, a telephone icon 708*b*, and a computer icon 708*c*. Carly 710 has a telephone icon 710*a*, a computer icon 710*b*, and a webcam icon 710*c*. A user can drag and drop graphical elements from the various portions of the user interface 700 to perform actions such as adding participants to the communication session 704, creating a new communication session, terminating a communication session, dividing a communication session, sharing information, and so forth.

A user can manipulate communication modalities of himself as well as others via the communication modality buttons 714. For example, the user can click and drag or otherwise move any one of the communication modality buttons 714 onto a participant icon, such as John 706. That action can trigger the system 100 to shift to the indicated communication modality or inquire of John 706 if he is willing to change to the indicated communication modality.

The basic input/output buttons 716 provide a user with basic functionality to manipulate the communication session, create a new communication session, or simply to answer system queries. For example, if the user wants to add a new participant to the communication session, the user can click the "new" button. The system 100 presents a dialog to the user to determine which contact to add to the communication session, and presents a confirmation dialog such as "Are you sure?" The user can then tap on the OK button to confirm, after which the system 100 adds the selected contact as a new participant.

Figure 8:
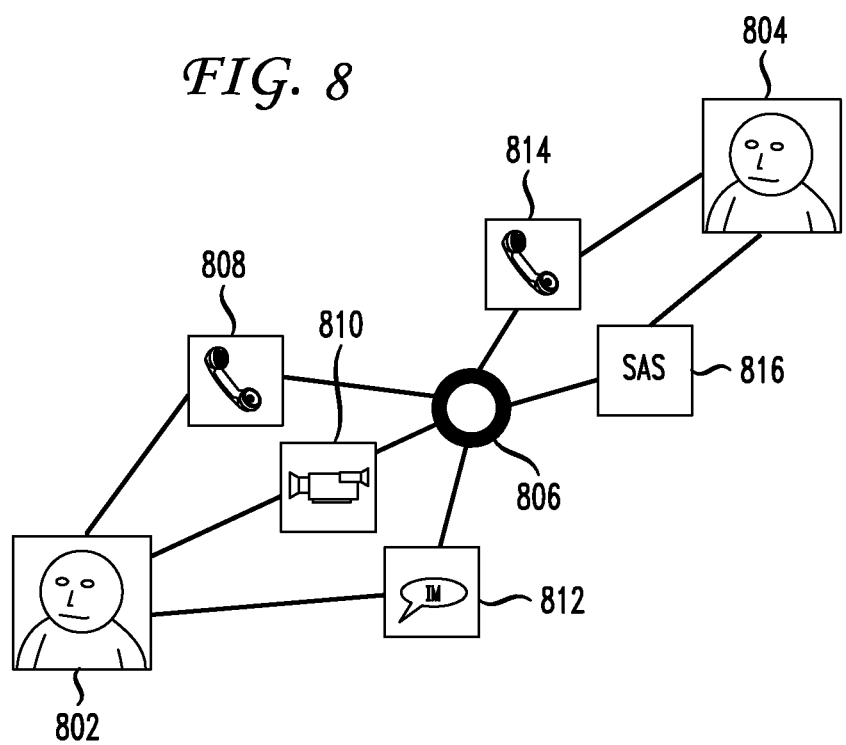
FIG. 8 illustrates one example application of graphical sub-elements in a graphical user interface (GUI)

FIG. 8 illustrates one example application of sub-elements in a graphical user interface (GUI). This example illustrates a communication session 800 with two participants 802, 804. The GUI showing the communication session 800 includes a graphical representation of communication session hub or session manager 806. Each participant's icon is connected to the communication session hub 806 via multiple lines representing different available, preferred, or currently used communication modalities. For example, participant 802 is connected to the communication session hub 806 via three lines: a line for telephone 808, a line for video conferencing 810, and a line for instant messaging 812. Participant 804 is connected to the communication session hub 806 via two lines: a line for telephone 814 and a line for text messaging 816.

A user can click and drag individual lines onto other contacts to establish additional communication sessions. For example, if participants 802, 804 are part of a larger communication session having more participants, participant 802 can establish a sidebar with participant 804 by dragging the IM line 812 and dropping it directly on participant 804. Then to terminate the sidebar, participant 804 can drag the IM line 812 back to the communication session hub 806.

In another aspect, the communication session includes multiple modalities for each participant. For example, the communication session can be a video conference where all participants have a video stream (if a video camera is available), one or more participants have an audio stream (if a microphone is available), and the session includes a text-based chat under the video stream. In this example, each participant in the graphical representation connects to the communication session via one, two, or three graphical links representing actual communication modalities. Users can individually control (i.e. terminate, add, mute, pause, and so forth) each modality's separate link to the communication session. For example, participant 802 can pause the video conference link 810 feeding a video stream to other participants 804 via the hub 806 but still maintain the other two modalities, telephone 808 and IM 812. Participant 802 can later resume the video conference link 810.

The disclosure now turns to the exemplary method embodiment shown in FIG. 9. For the sake of clarity, the method is discussed in terms of an exemplary system such as is shown in FIG. 1 configured to practice the method. FIGS. 2 and 4-8 illustrate exemplary graphical interfaces for the method disclosed in FIG. 9.

FIG. 9 illustrates an example method embodiment for managing communications mode neutrally using graphical user interface (GUI) widgets. The system 100 presents via a GUI a set of connected graphical elements representing a structure of a communication session comprising at least two communicating users, wherein each graphical element representing a user further comprises at least one graphical sub-element indicating user communication details (902). Graphical sub-elements, or communications widgets, can indicate a communication mode through which an associated user is connected to the communication session. Graphical sub-elements can also indicate available communication modes for an associated user. Some example graphical sub-elements include a telephone icon, a mobile phone icon, an instant message icon, a camera icon, a video camera icon, a microphone, a text message icon, a document icon, a headset icon, and an email icon. One or more of a line, a shape, proximity, a common shape, a common color, and a common appearance can connect the connected graphical elements in the GUI. In one aspect, the system 100 dynamically updates graphical sub-elements based on changing user communication details. For example, if a user shifts from instant messaging to video conferencing, the system 100 can update their respective sub-icon to reflect that shift.

The system 100 receives user input associated with the set of connected graphical elements, the user input having an action associated with the communication session (904). The user input can be a click of a mouse, a tap of a finger on a touch screen, or any other suitable input. The user can click, drag, drop, and otherwise move and locate icons as user input.

An example of applying user controls in a mode neutral way are provided below. For example, the display shown in FIG. 7 includes OK, CANCEL, UNDO (left arrow), and REDO (right arrow) buttons as part of the basic input/output buttons 716, which allow a user to edit the call connection graph in a sequence of steps and then perform the actions all at once after the user has confirmed with the OK button. CANCEL and UNDO/REDO allow the user to make corrections before any actions have been performed. For instance, the user can first add Reinhard to the existing audio session, then David, then JC. After pressing the OK button, the system 100 simultaneously dials out to the three new participants. The user can apply a similar sequence of steps to add three new participants to the existing IM session. The only difference in this instance of a mode-neutral GUI is that for extending the audio session the drop target for the new participants is the audio icon in the participant window, while for extending the IM session the drop target would be the IM icon. In another variation, the user simply drags all desired individuals' icons into a general communication session icon. The system 100 determines a modality common to all the desired individuals and contacts each individual in the common modality.

The system 100 performs the action based on the received user input (906). The system 100 can also receive a first user input indicating a specific graphical sub-element, display a menu of options based on the specific graphical sub-element and its respective associated user, receive a second user input selecting an option in the menu of options, and manipulate the communication session based on the second user input. In one instance, the system 100 manipulates the communication session by creating a separate communication session, but the other actions are possible consistent with the disclosure.

As can be appreciated based on this disclosure, the interface treats all communication modalities exactly the same with respect to session control. For example, as discussed herein, communication sessions of any mode or type can be controlled and managed using the same user input modalities. Thus, if communication sessions are started, ended, split, or if participants are added or removed, the same communication modalities (drag and drop, speech, gesture input, tapping, etc.) perform the same functions across different communication modes. An IM chat session with four participants can be split into two sessions of two IM chat participants using the same modality as splitting a telephone conference with four participants into two separate conferences of two people each. The communication session may be a video conference or a screen sharing session over the web. The user operations with respect to session control are identical.

Thus, the interfaces shown in FIGS. 2 and 4-8 can easily support a new mode of communication while enabling users to manage a new mode with the same communication modalities of the other modes. For example, if the system is to integrate a communication mode such as Google wave in addition to the call, video, IM, email and social shown in FIG. 2, then the GUI controls will be the same. The system 100 can receive the new mode and perform an integration process to enable control (such as start, end, splitting of sessions, etc.) of communication sessions under the new mode. Then the system presents a utility icon representing the new mode to the user. At this point, however, the user does not need to learn any new management modalities but can maintain the same semantics with respect to session control. The same call connection metaphors, control buttons, gestures, speech commands, flicker movements, device shaking or any other type of operation for user input will remain mode neutral. All of these input modalities are reused and applied in the interface for the additional modes of communication or communication device.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
presenting, via a graphical user interface controlled by a processor, an interaction space and a set of connected graphical elements to a user who is not participating in a communication session;
when a plurality of communicating users participating in the communication session are located in the interaction space, visually connecting the plurality of communicating users to represent the communication session wherein:
each user of the plurality of communicating users is represented by unique graphical elements in the set of connected graphical elements; and
each unique graphical element of the unique graphical elements comprises a graphical sub-element overlaid on top of the each unique graphical element and indicating a respective communication modality currently used by the plurality of communicating users, wherein the graphical sub-element enables the each user of the plurality of communicating users to change the respective communication modality by interacting with the graphical sub-element;
receiving user input associated with the set of connected graphical elements, the user input having an action associated with the communication session; and
performing the action based on the received user input.

2. The method of claim 1, wherein the graphical sub-element indicates an additional communication modality through which an associated user can communicate during the communication session.

3. The method of claim 2, wherein the graphical sub-element further indicates an availability of the additional communication mode.

4. The method of claim 1, wherein the graphical sub-element comprises one of a telephone icon, a mobile phone icon, an instant message icon, a camera icon, a video camera icon, a microphone, a text message icon, a document icon, a headset icon, and an email icon.

5. The method of claim 1, wherein the set of connected graphical elements are connected in the graphical user interface by one of a line, a shape, proximity, a common shape, a common color, and a common appearance.

6. The method of claim 1, further comprising updating the graphical sub-element based on changing user communication details.

7. The method of claim 1, wherein the graphical sub-element is a communications widget.

8. The method of claim 7, further comprising:
receiving a first user input indicating a specific graphical sub-element;
displaying a menu of options based on the specific graphical sub-element and its respective associated user;
receiving a second user input selecting an option in the menu of options; and
manipulating the communication session based on the second user input.

9. The method of claim 8, wherein manipulating the communication session comprises creating a separate communication session that is separate from the communication session.

10. The method of claim 1, wherein the graphical user interface accepts input via one of a mode-neutral user control, a mode neutral button, and a mode neutral gesture.

11. A system comprising:
a processor; and
a non-transitory computer-readable storage medium storing instructions which, when executed by the processor, cause the processor to perform operations comprising:
presenting, via a graphical user interface, an interaction space and a set of connected graphical elements to a user who is not participating in a communication session;
when a plurality of communicating users participating in the communication session are located in the interaction space, visually connecting the plurality of communicating users to represent the communication session, wherein:
each user of the plurality of communicating users is represented by unique graphical elements in the set of connected graphical elements; and
each unique graphical element of the unique graphical elements comprises a graphical sub-element overlaid on top of the each unique graphical element and indicating a respective communication modality currently used by the plurality of communicating users, wherein the graphical sub-element enables the each user of the plurality of communicating users to change the respective communication modality by interacting with the graphical sub-element;
receiving user input associated with the set of connected graphical elements, the user input having an action associated with the communication session; and
performing the action based on the received user input.

12. The system of claim 11, wherein the graphical sub-element indicates an additional communication modality through which an associated user can communicate during the communication session.

13. The system of claim 12, wherein the graphical sub-element further indicates an availability of the additional communication mode.

14. The system of claim 11, wherein the graphical sub-element comprises one of a telephone icon, a mobile phone icon, an instant message icon, a camera icon, a video camera icon, a microphone, a text message icon, a document icon, a headset icon, and an email icon.

15. The system of claim 11, wherein the set of connected graphical elements are connected in the graphical user interface by one of a line, a shape, proximity, a common shape, a common color, and a common appearance.

16. The system of claim 11, wherein the non-transitory computer-readable storage medium stores additional instructions which, when executed by the processor, cause the processor to perform further operations comprising updating the graphical sub-element based on changing user communication details.

17. The system of claim 11, wherein the graphical sub-element is a communications widget.

18. The system of claim 17, wherein the non-transitory computer-readable storage medium stores additional instructions which, when executed by the processor, cause the processor to perform further operations comprising:
   receiving a first user input indicating a specific graphical sub-element;
   displaying a menu of options based on the specific graphical sub-element and its respective associated user;
   receiving a second user input selecting an option in the menu of options; and
   manipulating the communication session based on the second user input.

19. The system of claim 18, wherein manipulating the communication session comprises creating a separate communication session that is separate from the communication session.

20. A non-transitory computer-readable storage device storing instructions which, when executed by a processor, cause the processor to perform operations comprising:
   presenting, via a graphical user interface, an interaction space and a set of connected graphical elements to a user who is not participating in a communication session;
   when a plurality of communicating users participating in the communication session are located in the interaction space, visually connecting the plurality of communicating users to represent the communication session wherein:
      each user of the plurality of communicating users is represented by unique graphical elements in the set of connected graphical elements;
      each unique graphical element of the unique graphical elements comprises a graphical sub-element overlaid on top of the each unique graphical element and indicating a respective communication modality currently used by the plurality of communicating users, wherein the graphical sub-element enables the each user of the plurality of communicating users to change the respective communication modality by interacting with the graphical sub-element; and
      each unique graphic element representing the plurality of communicating users is adjustably positioned;
   receiving user input associated with the set of connected graphical elements, the user input having an action associated with the communication session; and
   performing the action based on the received user input.

21. The non-transitory computer-readable storage device of claim 20, storing additional instructions which, when executed by the processor, cause the processor to perform further operations comprising:
   receiving a first user input indicating a specific graphical sub-element;
   displaying a menu of options based on the specific graphical sub-element and its respective associated user;
   receiving a second user input selecting an option in the menu of options; and
   manipulating the communication session based on the second user input.

22. The method of claim 1, wherein the action is joining the communication session.

* * * * *